Aug. 30, 1955   I. H. GRANT   2,716,499
BOAT TRAILER INCLUDING LOADING RAMP AND WHEEL MOUNT
Filed Aug. 14, 1953   3 Sheets-Sheet 1

Isaac H. Grant
INVENTOR.

BY
Attorneys

Aug. 30, 1955  I. H. GRANT  2,716,499
BOAT TRAILER INCLUDING LOADING RAMP AND WHEEL MOUNT
Filed Aug. 14, 1953  3 Sheets-Sheet 2
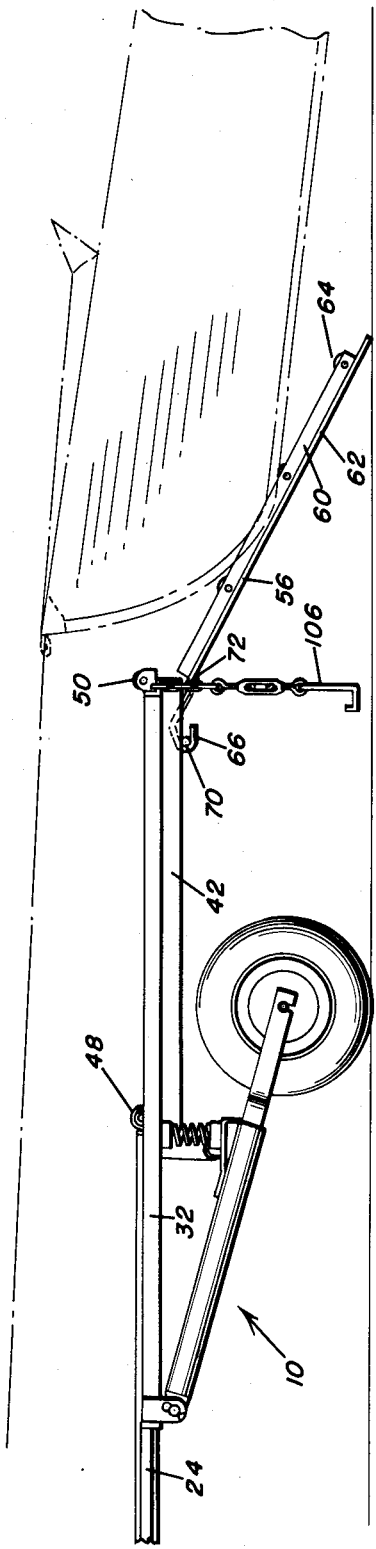
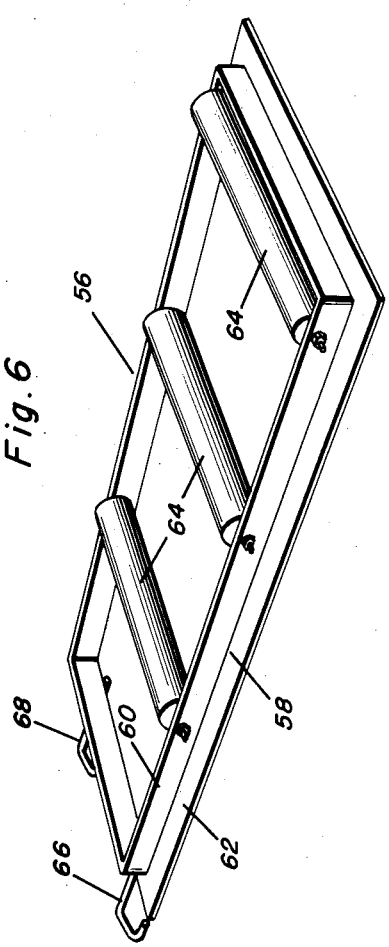
Isaac H. Grant
INVENTOR.
BY
Attorneys Aug. 30, 1955     I. H. GRANT     2,716,499
BOAT TRAILER INCLUDING LOADING RAMP AND WHEEL MOUNT
Filed Aug. 14, 1953     3 Sheets-Sheet 3
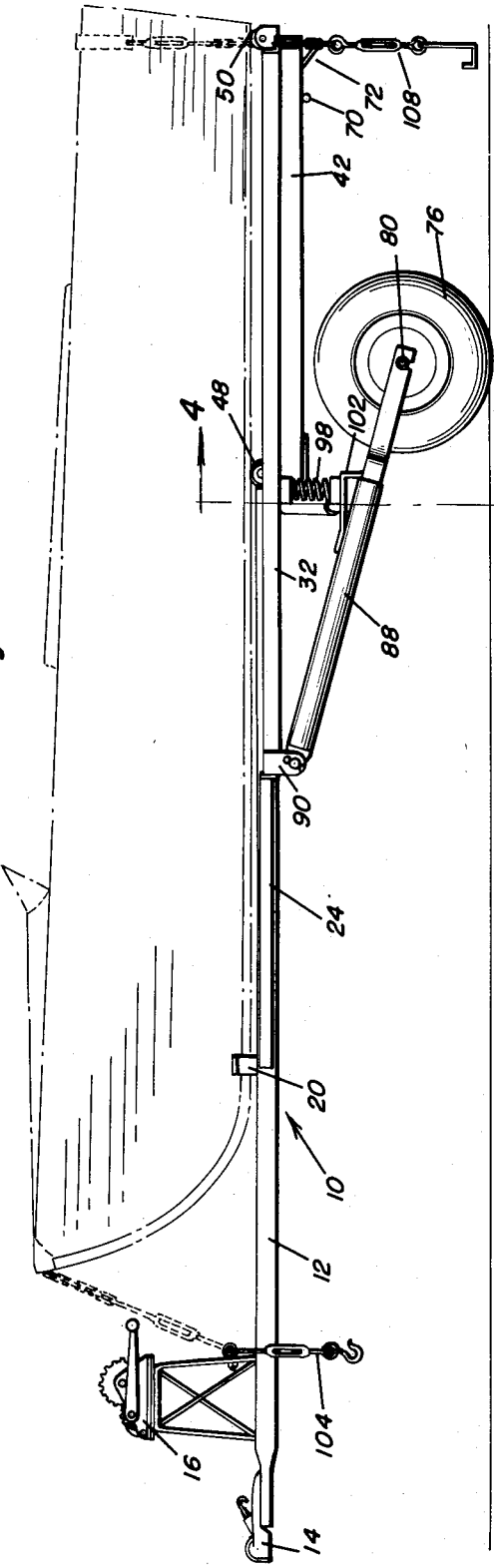
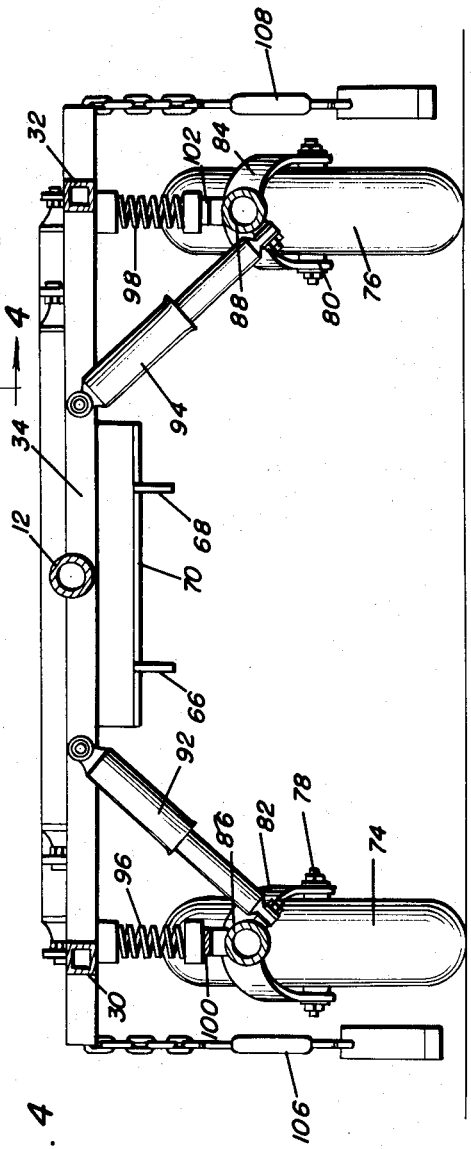
Isaac H. Grant
INVENTOR.

United States Patent Office 2,716,499
Patented Aug. 30, 1955

2,716,499

BOAT TRAILER INCLUDING LOADING RAMP AND WHEEL MOUNT

Isaac H. Grant, Panama City, Fla.

Application August 14, 1953, Serial No. 374,290

1 Claim. (Cl. 214—84)

This invention relates to a class of wheeled vehicles and more particularly to a boat trailer adapted to be used in transporting a boat from one location to another.

The primary object of this invention resides in the provision of a boat trailer in which there is incorporated means for more easily loading and supporting a boat thereon.

The construction of this invention features a boat trailer having a ramp slidably received within angle members depending from the frame of the trailer. The ramp is held in a novel manner and at a predetermined angle whereby the boat may be easily dragged onto the trailer using a winch secured to the drawbar of the trailer.

An additional feature of the invention resides in the novel suspension system utilized which enables the trailer to minimize any shocks or load vibration, thereby protecting the boat being supported thereon.

One of the advantages in mounting the winch on the drawbar of the trailer resides in the fact that this enables the boat to be drawn completely onto the trailer using the mechanical advantage afforded by the winch. Further, since the winch is mounted on the drawbar of the trailer, any cable or line carried thereby may be more easily fairleaded since the drawbar is substantially free from any incumbrances in any direction.

Another advantage of this invention resides in the fact that the ramp which is utilized in loading or unloading a boat on the trailer may be easily stored on supporting angles members depending from the frame of the trailer.

Still further objects and features of the invention reside in the provision of a boat trailer that is strong and durable, simple in construction and manufacture, capable of being readily and easily pulled by any conventional motor vehicle, and which is capable of supporting and securely holding a boat in a stabilized manner.

These, together with the various ancillary objects and features of the invention which will become apparent as the following description proceeds, are attained by this boat trailer, a preferred embodiment of which is illustrated in the accompanying drawings, by way of example only, wherein:

Figure 2 is a side elevational view of the boat trailer shown in position with a boat supported thereon;

Figure 3 is another side elevational view showing the boat trailer in the process of loading a boat thereon;

Figure 4 is a vertical sectional view as taken along the plane of line 4—4 in Figure 2;

Figure 6 is a perspective view of the ramp used in loading and unloading a boat and which comprises one of the important elements of the invention.

Figure 1:
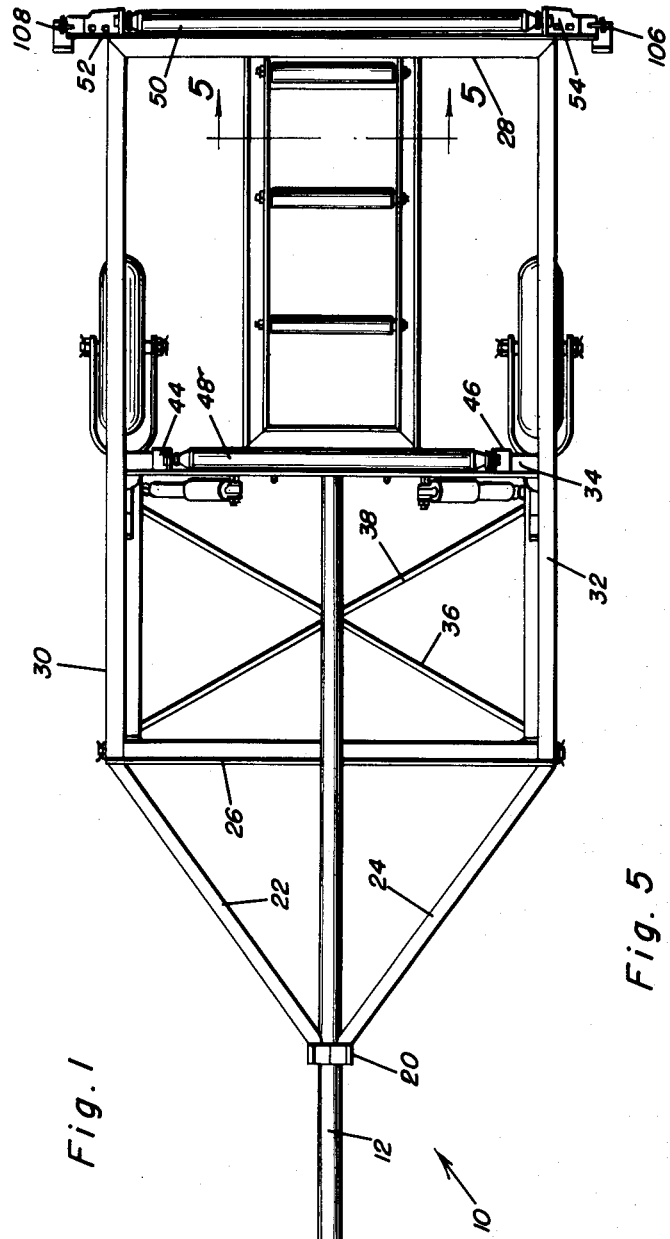
Figure 1 is a top plan view of the boat trailer comprising the present invention.
Figure 5:
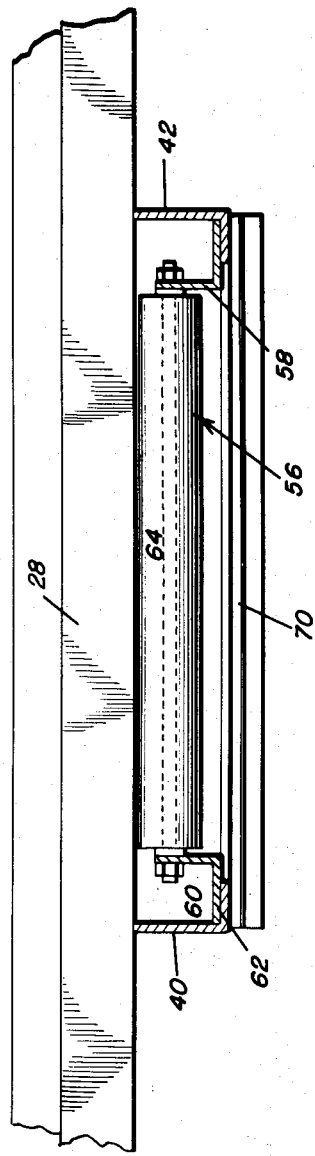
Figure 5 is an enlarged sectional detailed view as taken along the plane of line 5—5 in Figure 2.

With continual reference to the accompanying drawings, wherein like reference numerals designate similar parts throughout the various views, reference numeral 10 generally designates the boat trailer comprising the present invention. The boat trailer 10 includes a drawbar 12 which is provided with a suitable attaching device 14 for connecting the trailer to a suitable towing vehicle. Mounted on the dawbar 12 is a winch 16 having a drum 18 for a loading cable or other suitable line. The drawbar 12 has a suitable keel block 20 mounted thereon.

A frame for the trailer 10 is constructed from a pair of angularly outwardly and rearwardly extending brace members 22 and 24 which are connected at their outer ends to an angle frame member 26 extending transversely relative to the drawbar 12. Another transverse angle bar 28 forms the rear of the frame of the trailer 10 and longitudinal frame members 30 and 32 extend between the transverse frame members 26 and 28. An intermediate frame member 34 extends between the longitudinal frame members 30 and 32. Suitable braces as indicated at 36 and 38 are used to rigidify the frame.

Additional angularly shaped braces 40 and 42 extend between the intermediate frame member 34 and the rear transverse member 28. The braces 40 and 42 additionally serve a further function to be hereinafter described.

By means of suitable brackets 44 and 46 there is mounted a roller 48. Another roller 50 is mounted in brackets 52 and 54 attached to the rear transverse frame member 28. The rollers 48 and 50 are provided for enabling a boat to be pulled up onto the trailer 10 with a minimum amount of difficulty. There is provided a ramp generally indicated at 56 which is utilized first for lifting the prow of the boat to the level of the trailer 10. This ramp 56 includes a peripheral frame 58 of angle shape forming a vertically extending flange 60 and an outwardly extending flange 62. Extending between a pair of opposed sides of the vertical flange 60 are rollers 64 which are adapted to enable the boat to be more easily urged onto the trailer 10 by decreasing friction. Attached to the frame 58 are hook members 66 and 68 each of which are downwardly curved so as to more readily grasp a transverse rod 70 extending between the angle members 40 and 42 and which is secured thereto. At the end of the trailer 10, there is secured a downwardly and rearwardly extending plate 72 which is adapted to provide means for the front end of the ramp 56 to rest upon. Inasmuch as the acute angle which the plate 72 makes with the frame of the trailer 10 is predetermined, the ramp 56 is held at an acute angle in a stable manner due to the coaction between the hooks 66 and 68 and the rod 70 and the coaction between the flange 62 and the plate 72. This provides a stable arrangement whereby the boat may be more easily pulled upwardly onto the trailer 10.

The trailer 10 is supported by wheels 74 and 76 which are mounted on axles 78 and 80 carried by yokes 82 and 84 which are attached to downwardly and rearwardly extending wheel supports 86 and 88. The wheel supports 86 and 88 are pivotally attached to members as at 90 depending from the frame members 30 and 32. Stabilizers 92 and 94 are pivotally connected to the yokes 82 and 84 and to the frame member 34. Suitable spring mounts 96 and 98 depend from the frame members 30 and 32 and are carried by brackets 100 and 102 mounted on the wheel support members 86 and 88. Shackles or other securing members as indicated at 104, 106, and 108 are attached to the drawbar 12 and to the rear of the frame of the trailer 10 for holding a boat in position once it has been pulled onto the trailer. These securing devices 104, 106, and 108 may be provided with turnbuckles and retaining members for claspingly holding the boat in position.

As can be readily understood, when it is desired to load a boat onto the trailer 10, it is merely necessary to pull back upon the ramp 56 to thereby lower it to a position where the front end is supported on the angulated plate or support 72. The hooks 66 and 68 will of course engage the transverse rod 70. Then the cable from the wheel 18 may be attached to the prow of the boat and using the winch 16, the boat may be pulled up the ramp 56 utilizing the roller 64. Then, the boat can be further pulled over the rollers 48 and 50 to properly seat itself on the trailer. Then, using the fastening devices 104, 106, and 108, the boat may be secured in position on the trailer.

Since from the foregoing the construction and advantages of this boat trailer are readily apparent, further description is believed to be unnecessary.

However, since numerous modifications will readily occur to those skilled in the art after a consideration of the foregoing specification, and accompanying drawings, it is not intended to limit the invention to the precise embodiments shown and described, and accordingly, all suitable modifications and equivalents may be readily resorted to.

What is claimed as new is as follows:

A boat trailer comprising a wheeled frame, a pair of angle members extending with and secured to said frame, a transverse rod secured to said angle members adjacent the rear of said frame, a support secured to said members at the rear of said frame and having an upper surface extending at an acute angle relative to said frame, a ramp having a peripheral frame having a vertically extending flange with rollers attached thereto and having a peripheral outwardly extending flange slidably received on said angle members, said ramp having hooks attached thereto for engaging said retaining means with the forward end of said ramp supported by said support, a drawbar secured to said frame, and a winch on said drawbar for dragging a boat up said ramp and onto said frame, and securing means attached to said frame for securing a boat on said frame, said frame having rearwardly extending wheel supports and cushioning means extending between said wheel supports and said frame.

References Cited in the file of this patent

UNITED STATES PATENTS

| | | |
|---|---|---|
| 1,655,686 | Artas | Jan. 10, 1928 |
| 2,218,634 | Best | Oct. 22, 1940 |
| 2,370,427 | Sherry | Feb. 27, 1945 |
| 2,442,248 | Sampsell | May 25, 1948 |
| 2,485,793 | Vassar | Oct. 25, 1949 |
| 2,525,506 | Wiedman | Oct. 10, 1950 |
| 2,558,418 | Brueckman | June 26, 1951 |
| 2,584,396 | Naekel | Feb. 5, 1952 |
| 2,650,730 | Rohm | Sept. 1, 1953 |

FOREIGN PATENTS

| | | |
|---|---|---|
| 472,467 | Great Britain | Sept. 23, 1937 |
| 496,549 | Great Britain | Nov. 28, 1938 |